(12) United States Patent
Fouad

(10) Patent No.: US 10,039,422 B2
(45) Date of Patent: Aug. 7, 2018

(54) SHAKER BOTTLE WITH PLASTIC LINER

(71) Applicant: FITSOLUTIONS, LLC, Urbandale, IA (US)

(72) Inventor: Mark Fouad, Urbandale, IA (US)

(73) Assignee: FITSOLUTIONS, LLC, West Des Moines, IA (US)

( * ) Notice: Subject to any disclaimer, the term of this patent is extended or adjusted under 35 U.S.C. 154(b) by 0 days.

(21) Appl. No.: 15/582,051

(22) Filed: Apr. 28, 2017

(65) Prior Publication Data
US 2017/0361984 A1 Dec. 21, 2017

Related U.S. Application Data

(60) Provisional application No. 62/350,384, filed on Jun. 15, 2016.

(51) Int. Cl.
| | | |
|---|---|---|
| *B65D 23/02* | (2006.01) | |
| *A47J 43/27* | (2006.01) | |
| *B01F 15/00* | (2006.01) | |
| *B65D 21/02* | (2006.01) | |

(52) U.S. Cl.
CPC ......... *A47J 43/27* (2013.01); *B01F 15/00883* (2013.01); *B65D 21/0233* (2013.01); *B65D 23/02* (2013.01)

(58) Field of Classification Search
CPC ................ B65D 23/02; B65D 21/0233; B65D 2251/0028; A47J 43/27; B01F 13/0022; B01F 15/00512; B01F 15/00883; B01F 15/00506

USPC ......... 220/568, 23.87, 592.17, 23.86, 23.83, 220/23.89, 495.03; 206/514, 219; 426/112; 366/130
See application file for complete search history.

(56) References Cited

U.S. PATENT DOCUMENTS

| | | | | |
|---|---|---|---|---|
| 2,988,258 | A * | 6/1961 | Witzke | B65D 1/265 206/519 |
| 3,760,972 | A * | 9/1973 | McKirnan | A47G 19/12 206/515 |
| 4,921,713 | A * | 5/1990 | Fowler | A23L 2/395 239/33 |
| 6,138,862 | A * | 10/2000 | Tai | B65D 81/3869 206/516 |
| 8,820,571 | B2 * | 9/2014 | Apps | B65D 11/06 220/592.19 |
| 2010/0206174 | A1 * | 8/2010 | Loden | A47J 43/27 99/275 |

(Continued)

OTHER PUBLICATIONS

Giacona, Dominic L., "Shaker Sleeves Biodegradable disposable inserts for keeping protein cups clean", http://shakersleeves.com, pp. 1-5 Feb. 9, 2017.

(Continued)

*Primary Examiner* — Stephen Castellano
(74) *Attorney, Agent, or Firm* — McKee, Voorhees & Sease, PLC

(57) ABSTRACT

A powdered drink shaker bottle is provided with a rigid, disposable liner to minimize clean up and eliminate residual odors. The liner is shaped to fit inside the cup of the bottle, and includes a plurality of projections to facilitate mixing of a powdered drink in the bottle. The projections eliminate the need for a separate, removable mixing device, such as a ball or grate. An optional cap liner may also be provided.

15 Claims, 8 Drawing Sheets

(56) References Cited

U.S. PATENT DOCUMENTS

2013/0163370 A1\* 6/2013 Shaifer et al. ........... A23G 9/22
2013/0334225 A1\* 12/2013 Ekkert ............... B65D 51/1633
                                                                                                220/256.1
2015/0366236 A1\* 12/2015 Inoue ....................... A23G 9/22

OTHER PUBLICATIONS

Giacona, Dominic L., "Shaker Sleeves Make Cleaning Protein Cups Easy", http://shakersleeves.com/blog/, pp. 1-3, Powered by WordPress Feb. 9, 2017.

\* cited by examiner

SHAKER BOTTLE WITH PLASTIC LINER

CROSS-REFERENCE TO RELATED APPLICATIONS

This application claims priority to previously filed provisional application, U.S. Ser. No. 62/350,384, filed Jun. 15, 2016, which is herein incorporated by reference in its entirety.

BACKGROUND OF THE INVENTIONS

Drink bottles of various types are well-known for various users. The bottles are generally either disposable or re-usable. Re-usable bottles require cleaning to maintain proper sanitary conditions. Depending upon the bottle design, cleaning may be difficult. Also, if the bottle is not cleaned immediately after consumption of the beverage, undesirable smells due to presence of bacteria may be imparted to the bottle, particularly for plastic bottles, wherein such odor build-up may be difficult to remove. For example, protein drinks wherein powdered protein is mixed with water in the bottle, are prone to odor contamination of the bottle if liquid is left in the bottle too long, or if the bottle is not washed immediately after consumption. Also, the powder sometimes does not fully mix with the water due to insufficient shaking or clumping. Prior art solutions to improve mixing include a wire ball which is free to move within the bottle during shaking, or a screen or grate normally positioned adjacent the cap to facilitate mixing. However, the ball and grate must also be cleaned to maintain proper sanitization and avoid odors. Cleaning of the bottle and the mixing aids is often difficult or incomplete.

Plastic disposable bottle liners have been used in bottles, such as baby bottles, to minimize the cleaning and odor problems.

Therefore, a primary objective of the present invention is the provision of an improved shaker bottle having a disposable liner which eliminates cleaning of the bottle and the cap, and prevents odor problems inside the bottle and the cap.

Another objective of the present invention is the provision of the shaker bottle having a liner which is easy to install and remove for enhanced sanitation of the bottle.

A further objective of the present invention is the provision of a rigid, disposable liner for use in a shaker bottle to minimize cleaning up after consumption of a powdered beverage made in the bottle.

Yet another objective of the present invention is a provision of a liner for a sport drink or shaker bottle having projections to facilitate mixing of a powdered drink in the liner.

Another objective of the present invention is a provision of a shaker bottle liner which allows for complete mixing of a powdered beverage without need for a separate mixing mechanism, such as a ball or grate.

A further objective of the present invention is a provision of rigid disposable liners for use in shaker bottles wherein the liners can be packaged in a nested condition.

A further objective of the present invention is a provision of a rigid liner to matedly fit within a shaker bottle to eliminate residual odors in the bottle.

Still another objective of the present invention is a provision of rigid, disposable liners for use in a shaker bottle, wherein the liners can be economically manufactured, and easy and safe to use.

These and other objectives will become apparent from the following description of the invention.

DETAILED DESCRIPTION OF THE INVENTION

Figure 1:
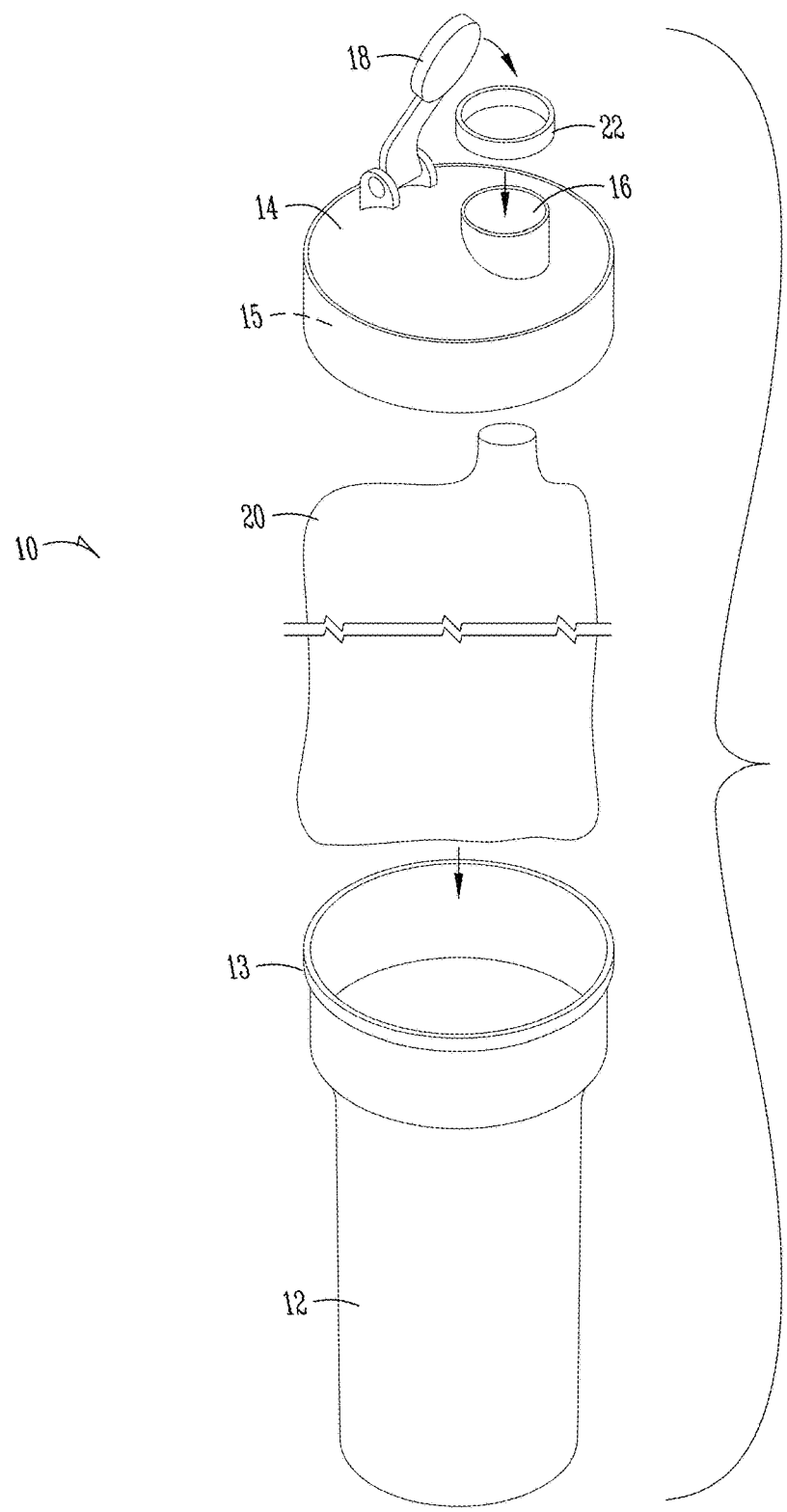
FIG. 1 is an exploded view of a first embodiment of the present invention showing the bottle components, including a disposable bag liner for the outer container or cup.

The sport or shaker bottle of the present invention is generally designated by the reference numeral 10 in the drawings. The bottle can include a base or cup 12 with a removable cap 14. The cap includes an opening 16 which forms a mouthpiece. A lid 18 is pivotally mounted to the cap 14 and can be moved between a closed sealed position on the mouthpiece 16 and an open position to allow drinking from the mouthpiece 16. The cup 12 and the cap 14 can be coupled using mating threads, friction fit, a sealing ring, or any other convenient manner which provides a leak-proof assembly.

It is understood that the cup 12 and the cap 14 can take various shapes or configurations, and that the cap 14 can be mounted to the cup 12 in any convenient manner, such as by mating threads 13, 15.

The present invention is directed to a disposable liner 20 which fits within the cup 12. In a first embodiment shown in FIGS. 1 and 2, the liner 20 is in the form of a soft or pliable plastic bag having an upper end, and which extends outwardly through the mouthpiece opening 16. The liner 20 can be installed in the cup 12 through the mouthpiece opening 16, with the cap 14 in place on the cup 12. Alternatively, the cap 14 can be removed from the cup 12 so the liner 20 can be inserted through the open upper end of the cup and then the cap 14 is replaced on the cup 12.

The upper end of the liner 20 extends outwardly through the mouthpiece opening 16, and is secured by a ring 22. The ring 22 can be mounted on the exterior of the mouthpiece 16 by press fit, threads, twist lock, or any other convenient manner. Thus, the bag liner 20 is sandwiched, or clamped, between the outer wall of the mouthpiece 16 and the ring 22.

A powdered drink mix, such as protein powder, can be added into the liner 20 either through the mouthpiece opening 16 or by removing the cap 14. Water, milk or another liquid can then be added into the liner 20. The cap 14 is threaded or sealed onto the cup 12 and the lid 18 is closed over the mouthpiece opening 16, such that the bottle 10 can be shaken to mix and/or dissolve the powder in the water, milk or other liquid. The consumer can then open the lid 18 and drink through the mouthpiece opening 16. When the beverage is consumed, the ring 22 can be removed to allow the liner 20 to be pulled out of the mouthpiece opening 16 for disposal. Since the beverage is fully contained within the liner 20, and does not touch the inside of the cup 12 or the cap 14, it is unnecessary to wash or clean the inside of the cup or cap. Furthermore, by precluding contact between the liquid and the inside of the bottle 10, odors in the bottle are eliminated.

Figure 2:
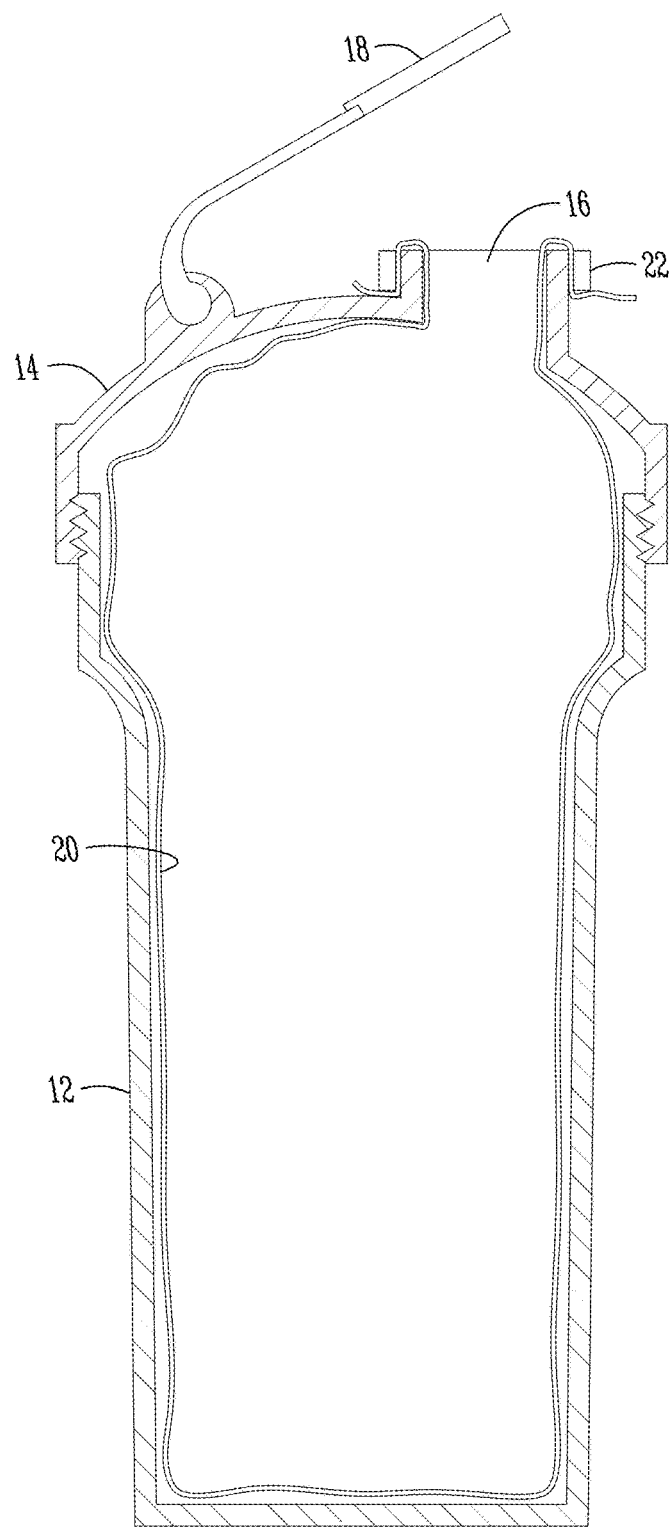
FIG. 2 is a sectional view of the first embodiment of the present invention with the bag-pipe liner positioned within the cup.
Figure 3:
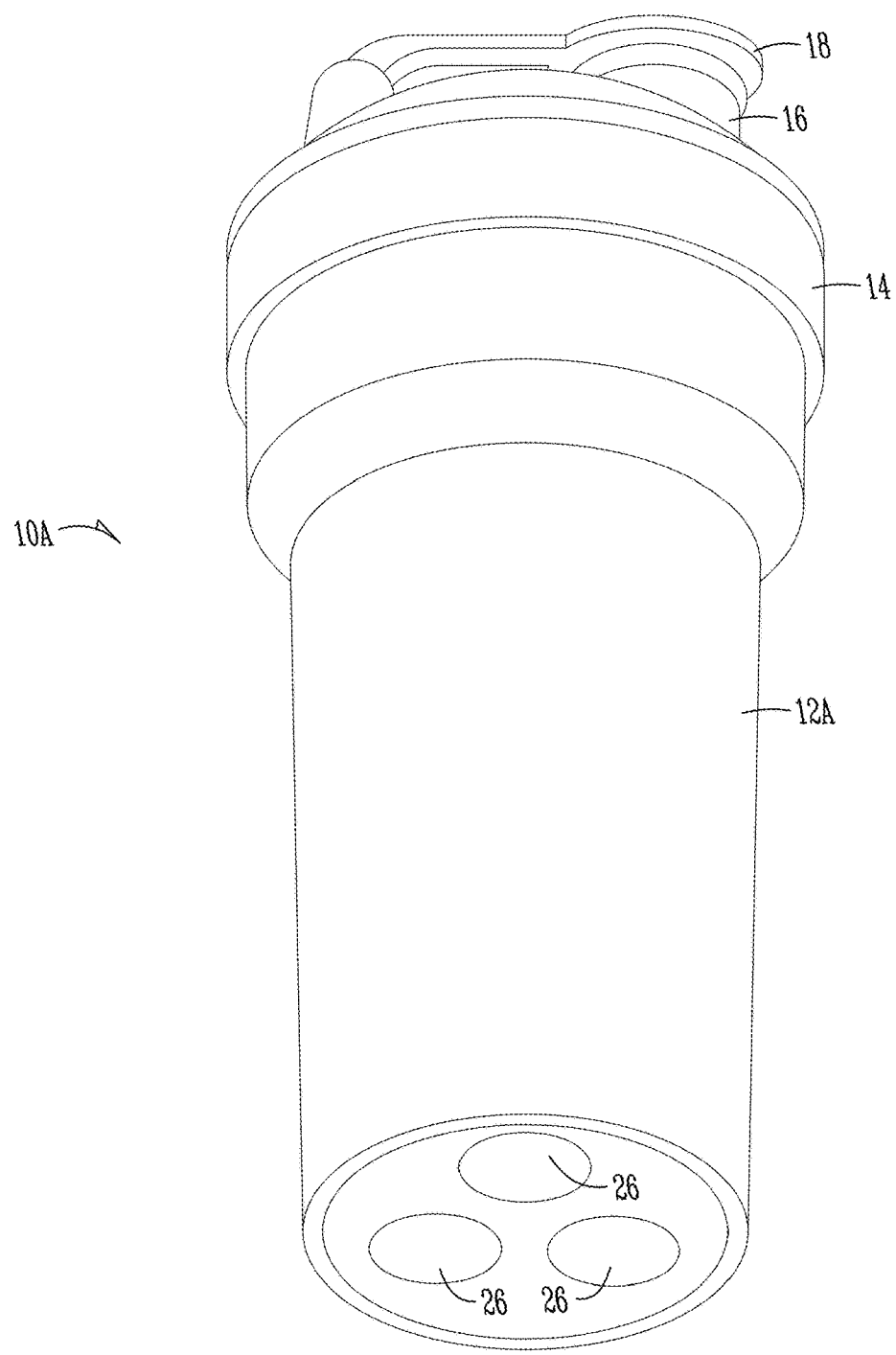
FIG. 3 is a perspective view of a second embodiment of the present invention utilizing a rigid, disposable liner.
Figure 4:
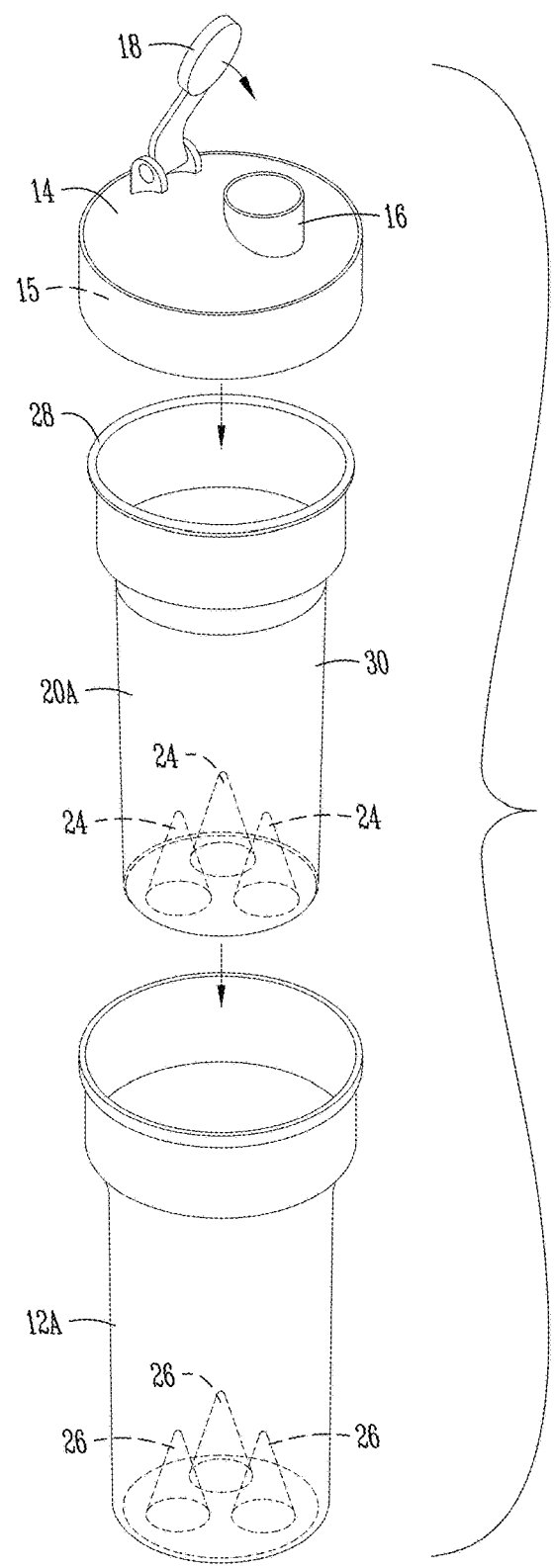
FIG. 4 is an exploded view of the second embodiment.
Figure 5:
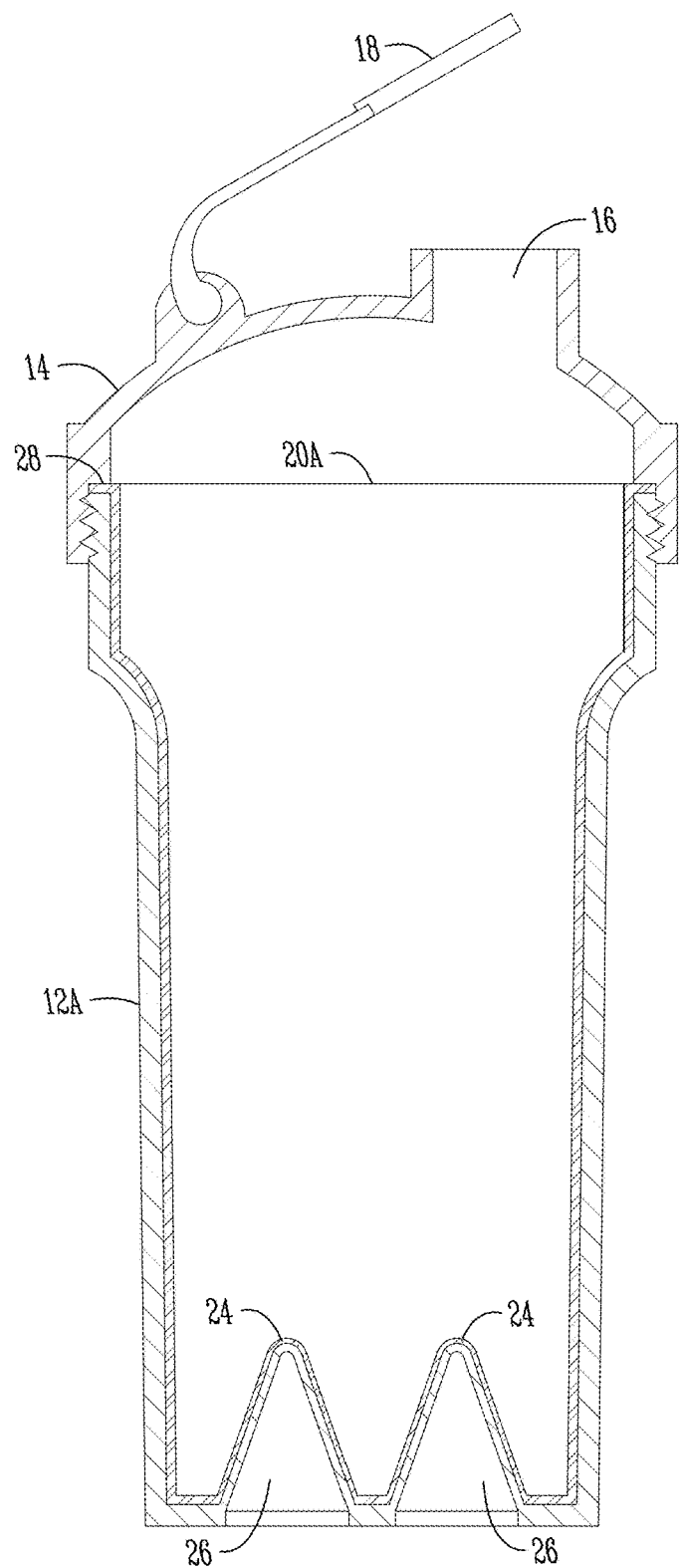
FIG. 5 is a sectional view of the second embodiment, taken along lines 5-5 of FIG. 3.
Figure 6:
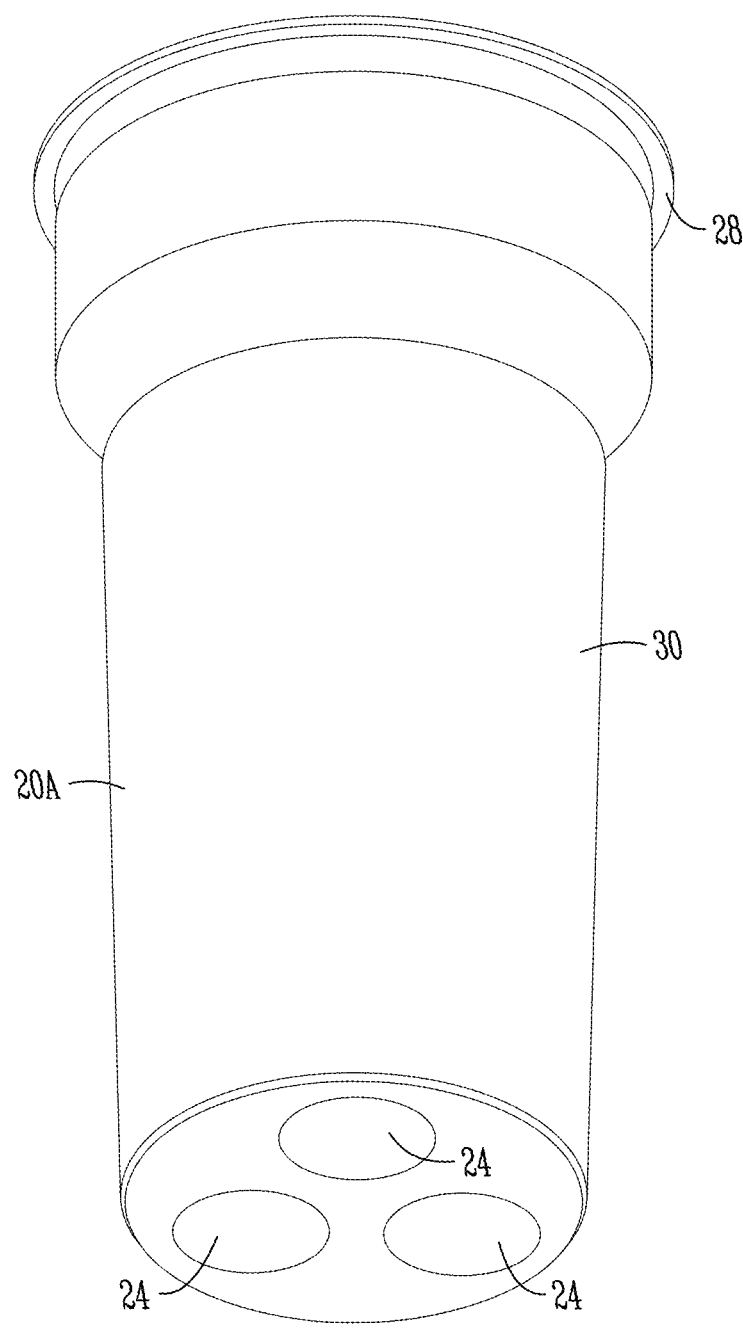
FIG. 6 is a perspective view of the rigid liner of the second embodiment.
Figure 7:
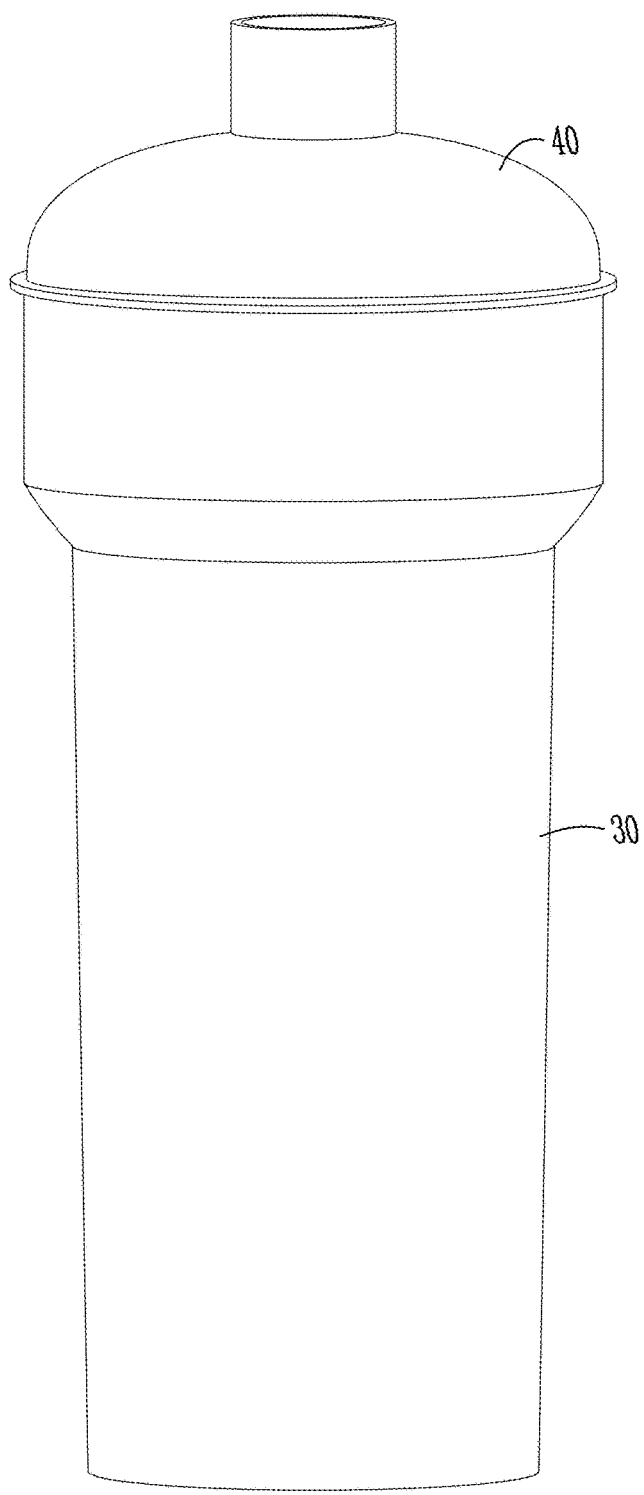
FIG. 7 shows another embodiment with a bottle liner and a cap liner.
Figure 8:
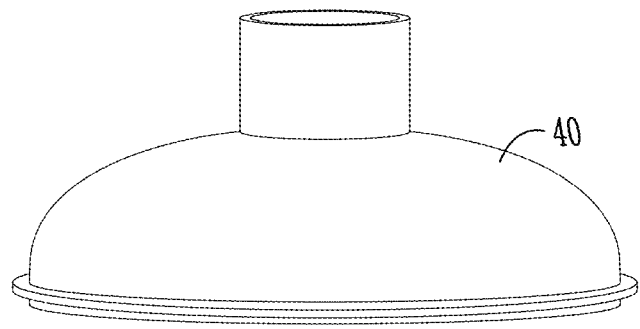
FIG. 8 is an elevation view of the cap liner.
Figure 9:
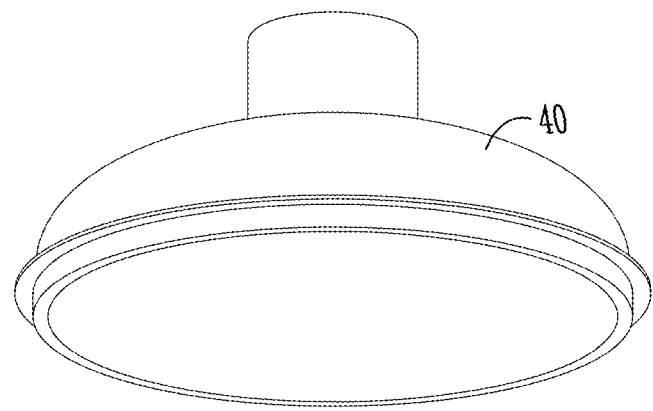
FIG. 9 is a lower perspective view of the cap liner.

The liner 20 can take various shapes and configurations. For example, the liner may be cylindrical, with an upper end, or alternatively, the liner may have a reduced diameter neck, as shown in FIG. 1, for extending through the mouthpiece opening. In FIG. 1, the liner neck is offset from center to match the non-centered position of the cap opening 16.

The liner 20 may also be flavored so as to impart flavoring to liquid added to the liner 20. For example, the liner may have a fruit or mint flavor, which would transfer to the drink within the liner. As another example, if a consumer has a chocolate protein drink, the liner can have a peanut-butter flavor, which would mix with the chocolate flavor. Flavoring of the liner 20 can be accomplished in various ways, including a film coating, impregnation, powder dusting, or any other convenient means.

In an alternative embodiment 10A, shown in FIGS. 3-6, the liner 20A is rigid and has a shape which preferably matingly nests within the cup 12A. The liner 20A has a bottom with one or more projections 24 extending upwardly. The projections 24 may take various shapes, such as conical (with a round, square, triangular, or hexagonal base), or other geometric configurations. The projections can also have different heights or shapes. The projections 24 facilitate mixing of the powdered drink, and eliminates the need for a separate mixing device, such as a mixing ball or grate, as in the prior art.

Another option is to provide projections 26 extending upwardly from the bottom of the cup 12A. The projections 26 are positioned and sized so as to fit within the projections 24 of the liner 20A. Thus, the liner 20A and the projections 24 nest within the cup 12A and on the projections 26. Such a nesting arrangement prevents the liner 20A from rotating within the cup 12A.

The liner 20A has an upper perimeter lip 28 which overlaps the top of the cup 12A when the liner and cup are assembled to prevent leakage of liquid between the cup 12A and the liner 20A.

Preferably, the liner 20A extends the full height of the cup 12A, or may extend over the top edge of the cup, without interfering with the cap 14.

Preferably, the sidewall 30 of the liner 20A is tapered from top to bottom, and the projections 24 are tapered from top to bottom, such that multiple liners can be stacked one within the other for packaging and shipping.

The liner 20A is disposable after the drink is consumed from the sport or shaker bottle 10A. The liner 20A eliminates the need to wash the cup 12A, or simplifies the cleaning process since powdered material does not contact or otherwise inadvertently stick to the inside of the cup 12A. The liner 20A also prevents odor contamination of the cup 12A, since the drink does not engage the walls of the cup 12A. The liner 20A may be flavored, such as by impregnation to import a flavor to the drink in the bottle 10A.

The liners 20A are disposable, and preferably recyclable. While the liners 20A may be washed, the preferred use is to throw out each liner after the beverage is consumed, and use a new liner for each new drink mix.

The liner 20A may be impregnated with a flavor, which can leach or pass to the beverage in the liner Another alternative is a disposable cap liner 40, which sits on top of the liner 20A and lines the inside of the cap 14. The cap liner 40 eliminates the need to wash the cap, and eliminates potential odors in an unwashed cap.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

The invention claimed is:

1. A shaker cup assembly for mixing powdered drinks, comprising:
   a cup;
   a rigid liner removably inserted into the cup having a bottom and a sidewall;
   a plurality of conical projections in the liner extending upwardly from the liner bottom and spaced inwardly from the liner sidewall;
   a cap secured to the cup to enclose the liner; and
   wherein the cup includes a bottom with at least one upwardly extending projection, and one of the liner projections is sized to receive the cup projection.

2. The shaker cup assembly of claim 1 wherein the liner nests inside the cup.

3. The shaker cup assembly of claim 1 wherein the projections are conical.

4. The shaker cup assembly of claim 1 wherein the liner is flavored.

5. The shaker cup assembly of claim 1 wherein the liner has a tapered body such that multiple liners can be stacked one inside another.

6. The shaker bottle of claim 1 further comprising a disposable cap liner.

7. A shaker bottle for mixing powdered drinks, comprising:
   a cup with a closed bottom, a sidewall, and an open top;
   a rigid liner sized to fit into the cup through the open top and having a bottom, a sidewall, and an open top;
   a cap mounted on the cup to enclose the liner, and having an opening for drinking from the shaker bottle;
   a lid mounted on the cap to selectively close the opening;
   the bottom of the cup having upwardly extending projections spaced apart from the cup sidewall;
   the liner having a bottom with upwardly extending projections spaced apart from the liner sidewall sized to fit over the projections in the bottom of the cup, wherein the liner projections define a primary mixing mechanism;
   the projections on the cup and liner having conical shapes for nested engagement; and
   wherein the liner projections enhance mixing of powder and liquid in the liner when the shaker bottle is shaken.

8. The shaker bottle of claim 7 wherein the projections on the cup nest into the projections on the liner.

9. The shaker bottle of claim 7 wherein the projections on the liner are larger than the projections on the cup.

10. The shaker bottle of claim 7 wherein the liner is disposable.

11. The shaker bottle of claim 7 wherein the liner matingly fits into the cup.

12. The shaker bottle of claim 7 wherein the liner is free from a secondary removable mixing mechanism.

13. The shaker bottle of claim 7 wherein the liner is flavored.

14. The shaker bottle of claim 7 wherein the liner has a side wall which is tapered inwardly from top to bottom.

15. The shaker bottle of claim 7 further comprising a disposable cap liner.

\* \* \* \* \*